United States Patent
Moroi et al.

[11] Patent Number: 6,113,329
[45] Date of Patent: Sep. 5, 2000

[54] LOCK NUT

[76] Inventors: Hideo Moroi, Ami 4965, Ami-machi, Inashiki-gun, Ibaraki-ken, 300-03; Eiko Tagusari, Dai2 Puchikomonzu Yamada, 1-1, Hara-machi 1-chome, Soka-shi, Saitama-ken, 340, both of Japan

[21] Appl. No.: 09/051,909
[22] PCT Filed: Jul. 14, 1997
[86] PCT No.: PCT/JP97/02425
  § 371 Date: Apr. 24, 1998
  § 102(e) Date: Apr. 24, 1998
[87] PCT Pub. No.: WO98/09086
  PCT Pub. Date: Mar. 5, 1998

[30] Foreign Application Priority Data

Jul. 14, 1997 [JP] Japan .................................. 8-241024

[51] Int. Cl.[7] .............................. F16B 39/12; F16B 39/22
[52] U.S. Cl. .......................... 411/223; 411/237; 411/278; 411/291
[58] Field of Search ..................... 411/223, 222, 411/237, 238, 239, 240, 277, 280, 290, 291, 278

[56] References Cited

U.S. PATENT DOCUMENTS

| | | | |
|---|---|---|---|
| 1,209,302 | 12/1916 | Zottel | 411/222 |
| 1,928,982 | 10/1933 | Rosenbaum | 411/222 |
| 1,975,815 | 10/1934 | Wilson | 411/277 X |

FOREIGN PATENT DOCUMENTS

| | | | |
|---|---|---|---|
| 55-110820 | 8/1980 | Japan . | |
| 55-115422 | 8/1980 | Japan . | |
| 168020 | 10/1920 | United Kingdom | 411/280 |
| 489885 | 8/1938 | United Kingdom | 411/291 |
| 617597 | 2/1949 | United Kingdom | 411/280 |

*Primary Examiner*—Neill Wilson
*Attorney, Agent, or Firm*—Armstrong, Westerman, Hattori, McLeland & Naughton

[57] ABSTRACT

This invention relates to a lock nut in which, when a double nut is fastened against a bolt, projections at the lock nut are deformed and crushed to be applied around the threaded part of the bolt and a frictional force is increased to improve an effect of looseness-prevention. A seat surface of a circumferential edge of the threaded hole 4 of the nut 2 is formed with a plurality of projections 5, 5, 5, the nut 2 is fastened against the fastening nut 7 already fastened against the bolt 6 acting as a member M to be fastened with its projections 5 being faced to the nut, the projections 5 deformed between seat surfaces 3, 8 of both nuts 2, 7 are applied around the threaded part between the threaded hole 4 of the nut 2 and the threaded part 9 of the bolt 6 so as to enable both nuts 2, 7 to be prevented from being loosened.

4 Claims, 4 Drawing Sheets

LOCK NUT

BACKGROUND OF THE INVENTION

1. Technical Field of the Invention

This invention relates to a double nut for use in fastening two nuts against a bolt in order to fix various kinds of machine devices or iron frames of a building or the like. This invention relates to an outside lock nut which is overlapped on a fastening nut so as to fasten the nut to prevent the fastening nut from being loosened.

2. Description of the Prior Art

A bolt and a nut for use in fastening component parts to various kinds of machine devices in the prior art or a bolt and a nut used in the case of fixing an iron frame of a building or the like are gradually loosened by vibration of the machine devices or the like. In view of this fact, there have been proposed various kinds of means for preventing looseness of such a nut as above.

For example, as shown in FIGS. 10(a), (b), there is provided means in which "a spring washer" is used. This spring washer 51 is made such that a part of the washer having a resilient force is cut and each of the cut portions 51a, 51a is slightly bent to their opposite directions. This spring washer 51 is inserted onto the bolt 52, placed between a seat surface 53a of the nut 53 and a fastening surface of the machine device or the like so as to generate always a tension force between the seat surface 53a of the nut 53 and the fastening surface and then the nut 53 is prevented from being loosened. In addition, in place of this spring washer 51, it is also possible to apply a toothed washer (not shown). This toothed washer is used for preventing the nut from being loosened by biting the teeth into the fastening surface with the fastening force of the nut.

In addition, as shown in FIGS. 11(a), (b), it is also possible to apply means in which a "pin" is passed through the nut. Means for passing the pin through this nut is made such that common through-pass holes 64, 65 are arranged in the threaded part 62 of the bolt 61 and the nut 63, a pin 66 such as a cotter pin, a tapered pin or the like is inserted into these through-pass holes 64, 65 so as to prevent positively the nut 63 from being loosened. In this case, in place of the through-pass hole 65 of this nut 63, there is proposed means in which a seat surface of the nut 63 is provided with a plurality of grooves in a radial manner, pins are engaged with these grooves to prevent the nut from being rotated and to prevent looseness of the nut.

Further, as shown in FIG. 12(a), as a simple looseness preventive means which is frequently used in the prior art, there is provided a double-nut. This double nut is operated such that another looseness preventive nut 71b is overlapped on a fastening nut 71a against a bolt 72 and only the outer nut 71b is further fastened forcedly. This double nut is applied in order to prevent these nuts 71a, 71b from being loosened due to vibration of the machine device or the like under fastening action of these nuts 71a, 71b (refer to FIG. 12(b)).

It can be expected that the aforesaid prior art spring washer 51 may provide an effect of preventing looseness just after its fastening. However, its use of longer period causes a resilient force of the spring washer 51 to be decreased and an effect of preventing looseness to be reduced. In addition, this prior art nut had a problem that the nut is not suitable for fastening of a heavy iron frame such as a building or the like. Similarly, although it could be expected that the toothed washer may provide an effect of preventing looseness against material quality such as a soft wooden product as compared with that of a metallic product of a small-sized machine device or a fastening component element, it could not be expected that an effect of preventing looseness is attained for a large-sized metallic machine device or the like.

In addition, means in which the pin 66 is passed through the nut 63 is made such that there are provided through-pass holes 64, 65 common to the threaded part 62 of the bolt 61 and the nut 63. Accordingly, when another nut is fastened, a position of each of the through-pass holes 64, 65 is not coincided to each other and the pin may not be passed through the through-pass holes. Further, even if the same nut 63 was applied, a position of each of the through-pass holes 64, 65 was not coincided to each other when the nut was fastened against the bolt 61. In turn, when the nut 63 was fastened against the bolt 61 in such a way that the positions of each of the through-pass holes 64, 65 are coincided to each other, it showed a problem that they are fastened in loosened state, resulting in that they can not be forcedly fastened.

In addition, when the double nut was fastened at one location, it was necessary to fasten nuts 71a, 71b twice and an operating step for further fastening only the outer nut 71b was added, resulting in that a quite troublesome fastening step was attained. In particular, the machine device or building requiring a large amount of nut fastening operations had a problem that the fastening steps might become a cause to delay a completion of work. In addition, since the work for confirming it individually whether or not the looseness preventive outer nut 71b is forcedly fastened was troublesome, it showed a problem that the twice fastening of the nut is easily forgotten.

The present invention has been invented in view of the aforesaid problems and it is an object of the present invention to provide a lock nut in which a seat surface of the looseness-preventive nut in the double nut is formed with a plurality of projections, thereby when the nut is fastened against the bolt, these projections are deformed and collapsed to increase a frictional force caused by biting of the projections into the threaded part of the bolt.

DESCRIPTION OF THE PREFERRED EMBODIMENTS

A gist of the lock nut of the present invention consists in an arrangement in which a seat surface of a circumferential edge of the nut is formed with a plurality of projections, the aforesaid nut is fastened with its projections being faced against a fastening nut already fastened against a bolt acting as a member to be fastened, the projections to be deformed between the seat surfaces of both nuts are merged into threaded engaged portions between the threaded holes of both nuts and the threaded part of the bolt so as to enable looseness of both nuts to be prevented.

In addition, it is also possible to arrange means in which each of the projections is formed with a claw faced toward a center of the threaded hole of the nut or the extremity end of each of the projections is formed with a threaded part capable of being threadably engaged with the threaded part of the bolt.

Additionally, it is also possible that the fastening nut is connected in advance to the projections of the lock nut at its seat surface.

With the aforesaid configuration, since the seat surface of the lock nut is formed with a plurality of projections, when the nut is overlapped on a fastening nut fastened against a bolt and the lock nut is fastened against the seat surface of the fastening nut toward the projections, each of the projections is pushed and crushed between the seat surface of the fastening nut and the seat surface of the lock nut. Thus, the lock nut can fasten the seat surface of the fastening nut already fastened in advance, resulting in that the lock nut may act as a so-called double nut. In addition, this lock nut can be fastened in such a way that each of the crushed projections is wound toward the threaded part of the bolt. Thus, this lock nut may provide a certain influence against a frictional force in fastening between the threaded hole of the nut and the threaded part of the bolt so as to attain a positive looseness-preventive action.

Further, the claws of the projections formed at the nut are easily crushed by fastening of the lock nut and wound toward the threaded part of the bolt. Or the projection forming a threaded protrusion capable of being threadably engaged with the threaded part of the bolt may provide a positive looseness-preventive action of the nut under an easy deformation of the protruded part by the fastening of the lock nut.

In addition, the lock nut having the fastening nut connected in advance is operated such that two nuts can be fastened concurrently through one fastening action. Even if the fastening nut is contacted with the member to be connected, the lock nut is fastened more, resulting in that the connected part is broken and the lock nut can be fastened. In this way, if the lock nut is separated from the fastening nut and the seat surfaces of the nuts are closely contacted to each other, this close contacted state shows that the looseness-preventive action (twice fastening operation) is already completed, resulting in that a forgotten twice fastening of the double nut can be easily confirmed.

PREFERRED EMBODIMENTS OF THE INVENTION

Figure 1:
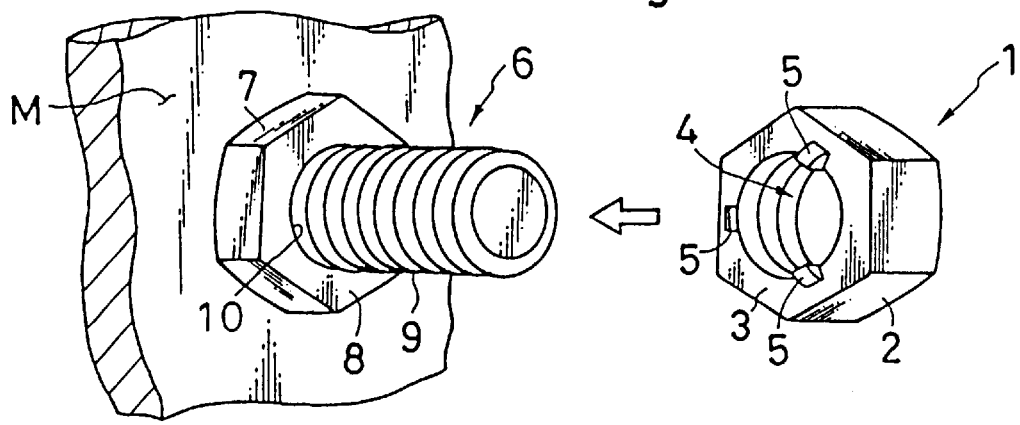
FIG. 1 is a perspective view for showing a first preferred embodiment of a lock nut of the present invention.
Figure 2:
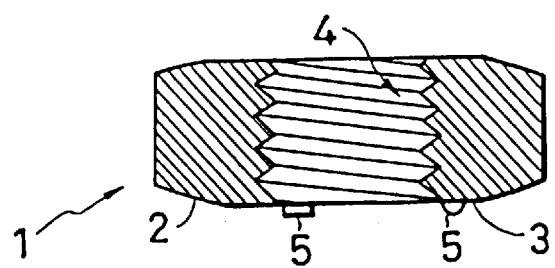
FIG. 2 a side elevational view in section for showing the lock nut of the present invention.
Figure 3:
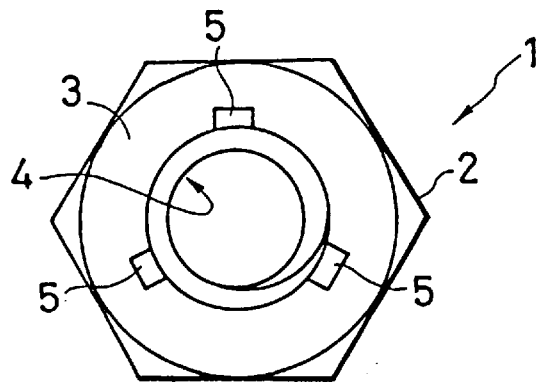
FIG. 3 is a bottom view for showing the lock nut of the present invention.
Figure 4:
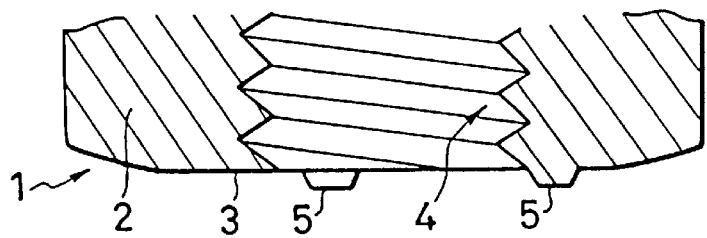
FIG. 4 is an enlarged side elevational view in section for showing the lock nut of the present invention.

Referring now to the accompanying drawings, some preferred embodiments of the lock nut of the present invention will be described.

FIGS. 1 to 4 illustrate a first preferred embodiment of the lock nut of the present invention.

The lock nut 1 of the present invention is constructed such that one of the seat surfaces 3 of a nut 2 such as a hexagonal nut, for example, having a predetermined lead angle and a pitch clearance as a so-called "female thread" is formed with a plurality of projections 5, 5, 5 in equal spaced-apart relation at a circumferential edge of the threaded hole 4. The projection 5 in the preferred embodiment of the present invention has a simple mountain-shaped form. These projections 5, 5, 5 are crushed between a seat surface 8 of the inside fastening nut 7 fastened to a bolt 6 acting as a fastening member NI and a seat surface 3 of the lock nut 1. A part of the crushed projection 5 is fastened to be crushed into the threaded part 9 of the bolt 6. In this way, the projections 5, 5, 5 may apply a certain influence against a frictional force of the threaded part 9 of the bolt 6 and the threaded hole 4 of the lock nut 1.

It is necessary that a height of these projections 5 is in a range from about 5% to about 10% in respect to a thickness of the lock nut 1. A reason why this is required consists in the fact too small size of the projection 5 causes the projection itself not to be applied around the threaded part 9 of the bolt 6 and may not act as a looseness-preventive member. To the contrary, too much large size of the projection 5 may produce a large clearance between it and the inner fastening nut 7 and may not act as a function of the double nut. When the lock nut 1 is fastened against the fastening nut 7, these projections 5, 5, 5 are crushed and applied around the threaded part 9 of the bolt 6, abutted against the seat surface 3 of the lock nut 1, wherein the seat surfaces 3, 8 are struck against to each other strongly to apply a looseness-preventive action. For example, the nut 2 of low carbon steel may be formed to have a certain high projection 5. In turn, it is preferable that the nut 2 of high carbon steel is formed to have a little high projection 5. That is, a size of the projection 5 is properly determined in response to a size of the nut 2 and its raw material.

In addition, the number of projections 5 are properly determined in response to a size or a shape of the nut 2. For example, in case of the large nut, it is possible to arrange four and five projections 5. In turn, in case of the small nut 2, it is preferable that two projections 5 may be applied. However, after these projections 5, 5 . . . are crushed by twice fastening operations, they are fastened in such a way that a part of the crushed projection 5 may be applied around the threaded part 9 of the bolt 6 so as to apply an influence against a frictional force of the threaded part 9 of the bolt 6, the threaded hole 4 of the lock nut 1 and the threaded hole 10 of the fastening nut 7. It is preferable that these projections 5, 5 . . . are arranged in a point symmetrical state around a central point of a central axis of each of the nuts 2, 7 or in an equal-spaced apart relation from the center point.

Figures 5A, 5B, 5C:
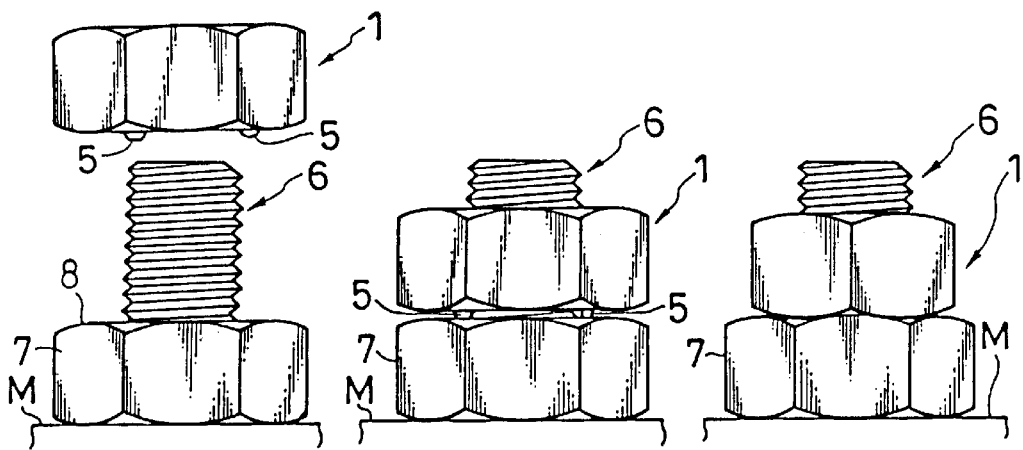
FIG. 5 is a front elevational view for showing a state in which the lock nut is fastened against the bolt, wherein (a) indicates the fastening nut kept under a state before the lock nut is fastened against a bolt already fastened, (b) indicates a state after the nut is fastened until the projections of the lock nut are contacted to the seat surface of the fastening nut, and (c) indicates a state in which the lock nut is fastened until the projections are crushed and fastened in such a way that the seat surfaces are contacted to each other.
Figure 6:
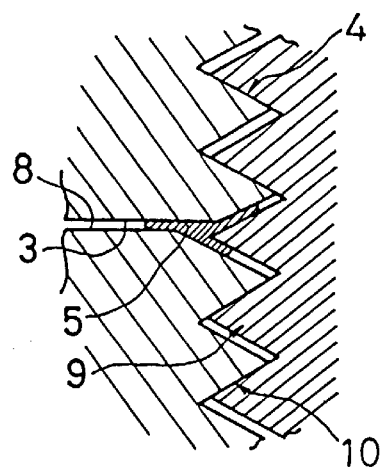
FIG. 6 is an enlarged sectional view of a substantial part for showing a fastened state between the threaded part of the bolt and the threaded hole of the nut.

FIGS. 5(*a*), (*b*) and (*c*) show a state in which the lock nut of the present invention is fastened to the bolt.

At first, the usual fastening nut 7 is fastened against the bolt 6 inserted into a part to be fixed to a fastened member M of a machine device or an iron frame of a building or the like. Then, the lock nut 1 of the present invention is fastened such that the projections 5, 5, 5 are faced against the seat surface 8 of the fastening nut 7 (refer to FIG. 5(*a*)). The nut is fastened until the projections 5, 5, 5 of the lock nut 1 are contacted with the seat surface 8 of the fastening nut 7 (refer to FIG. 5(*b*)). In addition, as the lock nut 1 is fastened, the projections 5, 5, 5 are crushed by the fastening force and the lock nut 1 can be approached to the fastening nut 7 (refer to FIG. 5(*c*)). At this time, the crushed projections 5, 5, 5 are applied around the threaded part 9 of the bolt 6 under their crushed state, the crushed portions of the projections 5 contribute to improve a frictional force and have a function to improve a looseness-preventive effect.

In the aforesaid preferred embodiment of the present invention, the arrangement in which the projections 5 are formed only at one seat surface 3 of the nut 1 has been described. However, these projections 5, 5, . . . may be formed at both seat surfaces 3, 3 of the nut 2. If both seat surfaces 3, 3 of the nut 2 are formed with the projections 5, 5 . . . , it is not necessary to confirm a front surface or a rear surface of the nut 2 when it is fastened against the bolt 6 and so it is possible to improve a fixing workability.

Figure 7:
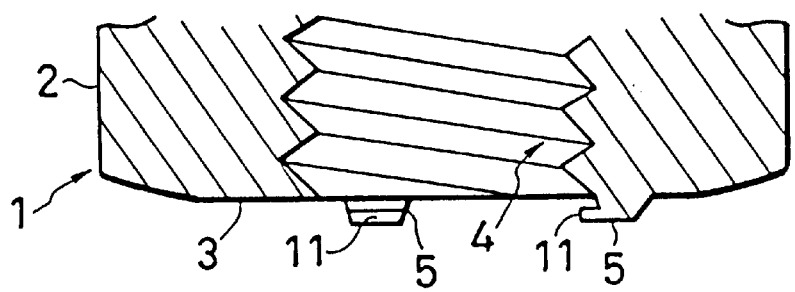
FIG. 7 is an enlarged side elevational view in section for showing a second preferred embodiment of the present invention in which the projection of the lock nut of the present invention is formed with claws.

FIG. 7 shows a second preferred embodiment of the present invention in which the projections of the lock nut of the present invention for formed with claws, wherein only the part differing from that of the first preferred embodiment will be described.

The second preferred embodiment of the present invention is constructed such that the projections 5, 5, 5 formed at the seat surface 3 of the nut 2 are formed with claws 11, 11, 11 faced toward the center of the nut 2. When the lock nut 1 is fastened against the bolt 6 in the same manner as that of the aforesaid first preferred embodiment of the present invention to cause the projections 5 to be fastened against the seat surface 8 of the fastening nut 7, these projections 5, 5, 5 are crushed and applied around the threaded part 9 of the bolt 6. As described above, when the projections 5, 5, 5 are provided with a plurality of claws 11, 11, . . . , the claws 11 are easily crushed and positively fastened toward the threaded part 9 of the bolt 6. The claw 11 has a function to contribute to improve a frictional force of fastening between the threaded hole 4 of the nut 2 and the threaded part 9 of the bolt 6 and to improve an effect of looseness-prevention.

Figure 8:
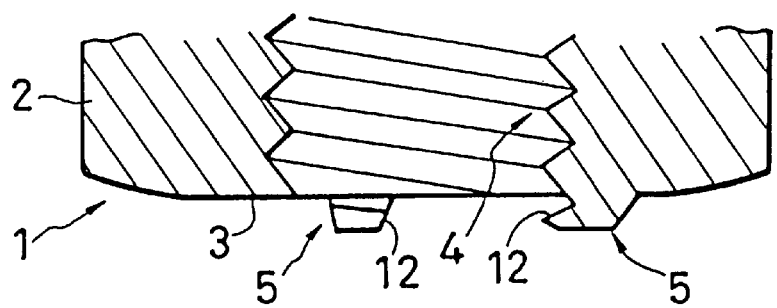
FIG. 8 is an enlarged side elevational view in section for showing a third preferred embodiment of the present invention in which the extremity end of the projection of the lock nut of the present invention is formed with a screw thread.

FIG. 8 shows a third preferred embodiment of the present invention in which the extremity end of the projection of the lock nut is formed with a screw thread threadably engaged with the threaded part of the bolt, wherein only the part differing from that of the first preferred embodiment will be described.

The third preferred embodiment of the present invention is constructed such that the projection 5 formed at the nut 2 is formed with a screw thread 12 threadably engaged with the threaded part 9 of the bolt 6 as it is. Forming of the screw thread 12 at each of the projections 5 enables the projection 5 to be easily deformed and further causes it to be easily applied around the threaded part 9 of the bolt 6. The projection 5 formed with the screw thread 12 may provide a positive looseness-preventive action against the lock nut 1.

Figure 9:
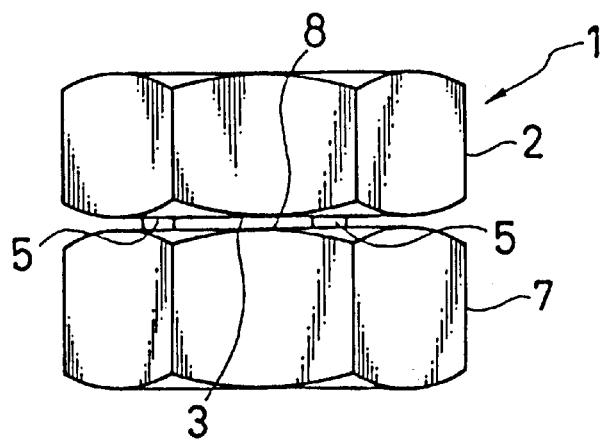
FIG. 9 is a side elevational view for showing a fourth preferred embodiment of the present invention in which the extremity end of the projection of the lock nut of the present invention is provided with an inside fastening nut in advance.
Figure 10A:
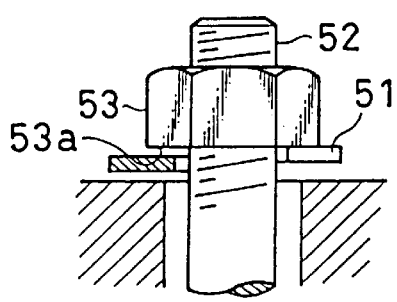
FIG. 10 is a bolt and a nut having the prior art spring washer, wherein (a) is a side elevational view and (b) is a top plan view.
Figure 10B:
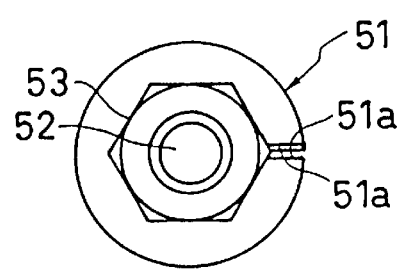
Figure 11A:
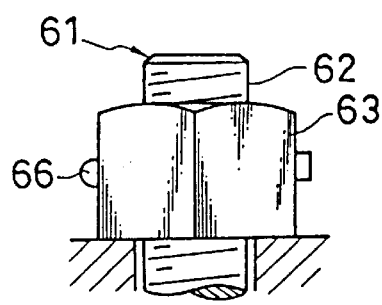
FIG. 11 shows a looseness-preventive bolt and nut using the prior art pin, wherein (a) is a side elevational view and (b) is a top plan view.
Figure 11B:
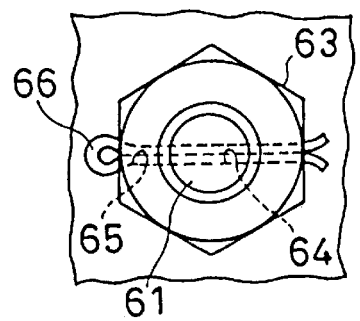
Figure 12A:
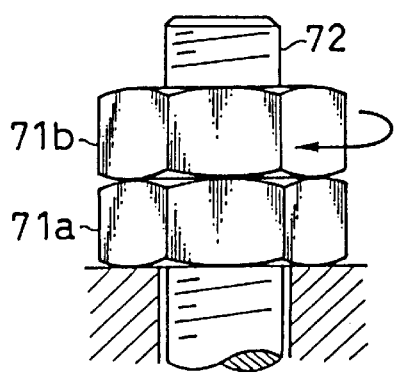
FIG. 12 shows the prior art double nut, wherein (a) is a side elevational view and (b) is a substantial enlarged sectional view for showing a fastened state between the threaded part of the bolt and the threaded hole of the nut.
Figure 12B:
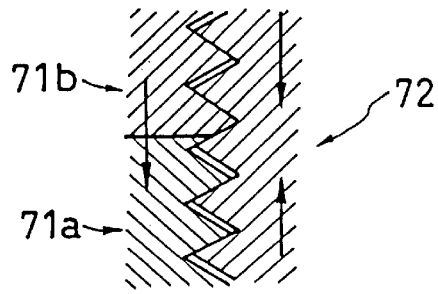

FIG. 9 shows a fourth preferred embodiment of the present invention in which the extremity end of the lock nut is fixed with an inside fastening nut in advance.

The lock nut 1 of the fourth preferred embodiment of the present invention is constructed such that the inside fastening nut 7 is connected to the projections 5, 5, 5 by spot welding or with adhesive agent. This lock nut 1 is made such that it is connected near the threaded holes 4, 10 of the seat surfaces 3, 8 of the two nuts 2, 7 in advance by a spot welding or with adhesive agent. Such a lock nut 1 having the fastening nut 7 connected thereto is operated such that two nuts 2, 7 can be fastened concurrently through one fastening operation by fastening it against the bolt 6. Then, further fastening of only the outside lock nut causes the welded portion or adhesive agent between the projections 5, 5, 5 and the seat surface 8 to be broken and only the lock nut 1 can be fastened more. At this time, the separated lock nut 1 is set such that each of the projections 5 is crushed and can be fastened against the seat surface 8 of the inside fastening nut 7. This projection 5 may also be fastened against the threaded part 9 of the bolt 6 so as to contribute to improvement of frictional force of fastening force between the threaded holes 4, 10 of the nuts 2, 7 and the threaded part 9 of the bolt 6 and improve an effect of looseness-prevention and further the fastening action can be carried out fast.

In the fourth preferred embodiment of the present invention, two parallel arranged nuts 2, 7 can be fastened to the bolt 6 under a state in which a lead angle and a pitch clearance of the threaded holes 4, 10 of each of the nuts 2, 7 form the projections 5, 5, 5 in such a way that the nuts may be fastened concurrently to the bolt 6 inserted into the member M to be fastened such as various kinds of machine devices or iron frames of the building or the like. That is, the two nuts 2, 7 are spaced apart in such a way that the lead angle of the threaded holes 4, 10 of both nuts 2, 7 are set to be same and their pitch clearances may become same and both of them are connected at the projections 5, 5, 5 under this state.

In the aforesaid fourth preferred embodiment of the present invention, a shape and a thickness of the hexagonal nuts 2, 7 arranged side by side have been described in reference to the hexagonal nut of the same size and same shape. However, it is satisfactory if the outside hexagonal nuts 1 (2) can be forcedly fastened as a double nut and have a looseness-preventive action, so that the shapes of both nuts 2, 7 are not limited to the same size and the same shape. For example, it is apparent that a thin lock nut 1 may also produce an effect of looseness-prevention and various kinds of combinations can be applied.

In each of the aforesaid preferred embodiments, the lock nut 1 in which a hexagonal nut is formed with the projections 5 has been described. However, if the lock nut 1 is one in which the nut is fastened against the fastening nut 7 to act as the double nut, it is not limited to a hexagonal nut. It is of course apparent that this lock nut 1 may be selected from any of a rectangular nut, an octagonal nut and any other shapes.

APPLICABILITY IN INDUSTRIAL APPLICATION

Since the lock nut of the present invention is made such that a seat surface of a nut is formed with a plurality of projections, fastening of the lock nut with the projections being faced against the seat surface of the fastening nut causes the lock nut itself to be fastened with the crushed projections being applied around the fastened part between the threaded part of the bolt and the threaded hole of the nut so as to enable an effect of looseness-preventive action to be improved.

In addition, in the case of arrangement in which the fastening nut is connected to the lock nut in advance, the lock nut is separated from the fastening nut and if the seat surfaces of the nuts are closely contacted to each other, it shows that the looseness-preventive operation (twice fastening action) has been completed, resulting in that it is possible to confirm that a forgotten fastening of twice fastening of the double nut can be easily confirmed.

What is claimed is:

1. A lock nut having a seat surface at a circumferential edge of a threaded hole of said lock nut formed with a plurality of projections, wherein said lock nut is fastened against a fastening nut already fastened to a bolt of a member to be fastened with said projections on said seat surface faced against said fastening nut, said projections being deformed between said seat surface on said lock nut and a seat surface on said fastening nut applied to one of said nuts around threaded portions of the threaded holes of said nuts and threaded part of said the bolt for preventing loosening of said lock nut and said fastening nut.

2. A lock nut according to claim 1 wherein each of said projections is formed with claws directed toward a center of the threaded holes of said nuts.

3. A lock nut according to claim 1, wherein the extremity of said projection is formed with a screw thread of said lock nut for threadably engaging with said threaded part of the bolt.

4. A lock nut according to one of claim 1, 2 or 3, wherein said fastening nut is connected at its seat surface to a projection side ot said lock nut.

* * * * *